(12) United States Patent
Rhode et al.

(10) Patent No.: US 10,183,640 B2
(45) Date of Patent: Jan. 22, 2019

(54) SYSTEMS AND METHODS FOR DOOR COLLISION AVOIDANCE

(71) Applicant: Ford Global Technologies, LLC, Dearborn, MI (US)

(72) Inventors: Douglas Scott Rhode, Farmington Hills, MI (US); Levasseur Tellis, Southfield, MI (US); David J. Schmidt, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/436,364

(22) Filed: Feb. 17, 2017

(65) Prior Publication Data

US 2018/0238098 A1   Aug. 23, 2018

(51) Int. Cl.
| | |
|---|---|
| *B60R 21/0134* | (2006.01) |
| *E05C 17/00* | (2006.01) |
| *E05F 15/40* | (2015.01) |
| *E05B 85/10* | (2014.01) |
| *B60J 5/04* | (2006.01) |

(Continued)

(52) U.S. Cl.
CPC ............ *B60R 21/0134* (2013.01); *B60J 5/04* (2013.01); *E05B 85/10* (2013.01); *E05C 17/006* (2013.01); *E05F 15/40* (2015.01); *E05F 15/622* (2015.01); *E05F 15/73* (2015.01)

(58) Field of Classification Search
CPC .... B60R 21/0134; E05F 15/73; E05F 15/622; E05F 15/40; B60J 5/04; E05C 17/006; E05B 85/10

See application file for complete search history.

(56) References Cited

U.S. PATENT DOCUMENTS 7,193,509 B2 *   3/2007   Bartels ............... B60Q 1/2665
                                                      318/466
7,280,035 B2 * 10/2007   McLain ............. B60R 13/043
                                                      340/435

(Continued)

FOREIGN PATENT DOCUMENTS

| CN | 103010139 B | 4/2013 |
| CN | 203242181 U | 10/2013 |

(Continued)

OTHER PUBLICATIONS

Christopher Nebolsky, *Haptic Blind Spot Alert System*, Spring 2013 Haptics Class Project Paper presented at the University of South Florida, Apr. 29, 2013, (16 Pages).

(Continued)

*Primary Examiner* — Russell Frejd
(74) *Attorney, Agent, or Firm* — James P. Muraff; Neal, Gerber & Eisenberg LLP

(57) ABSTRACT

A vehicle includes: (a) a rotatable door including: a door stop assembly configured to arrest opening of the door; a rotatable handle; a haptic feedback assembly arranged to vibrate the handle; (b) processor(s) configured to simultaneously activate the door stop and haptic feedback assemblies. The haptic feedback assembly is disposed within the rotatable handle. The processor(s) are configured to: compute a time-to-collision, and run the haptic feedback assembly at a level based on the time-to-collision.

20 Claims, 6 Drawing Sheets

(51) Int. Cl.
*E05F 15/73* (2015.01)
*E05F 15/622* (2015.01)

(56) References Cited

U.S. PATENT DOCUMENTS

| | | | | |
|---|---|---|---|---|
| 7,500,711 | B1* | 3/2009 | Ewing | E05F 15/622 |
| | | | | 296/146.1 |
| 7,528,704 | B2* | 5/2009 | Das | B60R 21/013 |
| | | | | 296/146.1 |
| 7,586,402 | B2* | 9/2009 | Bihler | B60Q 9/008 |
| | | | | 340/435 |
| 7,908,060 | B2 | 3/2011 | Basson et al. | |
| 8,180,547 | B2 | 5/2012 | Prasad et al. | |
| 8,319,620 | B2 | 11/2012 | Usher et al. | |
| 8,620,549 | B2 | 12/2013 | Nickolaou et al. | |
| 9,457,763 | B2* | 10/2016 | Takenaka | B60R 21/36 |
| 9,610,975 | B1 | 4/2017 | Hu et al. | |
| 9,759,004 | B2 | 9/2017 | Uno | |
| 2003/0093873 | A1 | 5/2003 | Linnenbrink | |
| 2003/0163895 | A1 | 9/2003 | Liang et al. | |
| 2004/0049323 | A1 | 3/2004 | Tijerina | |
| 2004/0095250 | A1* | 5/2004 | Chapman | G01V 8/20 |
| | | | | 340/686.6 |
| 2004/0252020 | A1 | 12/2004 | Matsumoto | |
| 2005/0134084 | A1 | 6/2005 | Rangnekar | |
| 2005/0280518 | A1 | 12/2005 | Bartels et al. | |
| 2006/0187304 | A1* | 8/2006 | Sakata | H04N 7/181 |
| | | | | 348/148 |
| 2006/0267321 | A1* | 11/2006 | Harish | B60R 21/01532 |
| | | | | 280/735 |
| 2007/0050110 | A1 | 3/2007 | Kondoh | |
| 2007/0188312 | A1 | 8/2007 | Bihler et al. | |
| 2007/0244641 | A1 | 10/2007 | Altan et al. | |
| 2008/0218381 | A1* | 9/2008 | Buckley | B60Q 1/50 |
| | | | | 340/932.2 |
| 2008/0294314 | A1 | 11/2008 | Morris et al. | |
| 2009/0033477 | A1 | 2/2009 | Illium et al. | |
| 2011/0032119 | A1 | 2/2011 | Pfeiffer | |
| 2011/0169626 | A1 | 7/2011 | Sun et al. | |
| 2011/0196568 | A1 | 8/2011 | Nickolaou et al. | |
| 2012/0293313 | A1 | 11/2012 | Yu | |
| 2013/0099523 | A1 | 4/2013 | Brown | |
| 2013/0153324 | A1 | 6/2013 | Kissel | |
| 2013/0342330 | A1 | 12/2013 | Kiefer | |
| 2014/0098230 | A1 | 4/2014 | Baur | |
| 2014/0207344 | A1 | 7/2014 | Ihlenburg | |
| 2014/0257659 | A1 | 9/2014 | Dariush | |
| 2015/0120150 | A1 | 4/2015 | Kreder | |
| 2015/0246639 | A1 | 9/2015 | Nagata et al. | |
| 2015/0309562 | A1 | 10/2015 | Shams et al. | |
| 2015/0355711 | A1 | 12/2015 | Rihn | |
| 2016/0348413 | A1 | 12/2016 | Broadhead et al. | |
| 2017/0200369 | A1 | 7/2017 | Miller et al. | |
| 2017/0260790 | A1 | 9/2017 | Sauerwein et al. | |
| 2017/0260792 | A1 | 9/2017 | Torres Fernandez | |
| 2017/0292311 | A1 | 10/2017 | Podkopayev | |
| 2017/0361839 | A1* | 12/2017 | Bidner | B60Q 1/46 |
| 2018/0044963 | A1* | 2/2018 | Gomez Melchor | E05F 15/40 |

FOREIGN PATENT DOCUMENTS

| | | |
|---|---|---|
| CN | 104097601 A | 10/2014 |
| CN | 204077568 U | 1/2015 |
| CN | 204210378 U | 3/2015 |
| CN | 105196953 A | 12/2015 |
| DE | 102004049054 A1 | 4/2006 |
| DE | 102004049504 A1 | 4/2006 |
| DE | 102005014581 A1 | 9/2006 |
| DE | 102008050685 A1 | 4/2010 |
| DE | 102014011121 A1 | 1/2016 |
| FR | 2897799 A1 | 8/2007 |
| JP | H04166579 A | 6/1992 |
| JP | 2017159744 A | 9/2017 |
| KR | 1020140036367 A | 3/2014 |

OTHER PUBLICATIONS

*Introduction to Haptic Feedback*, 2015, England (8 Pages).
William (Skip) Outcalt, *Centerline Rumble Strips*, Report No. CDOT-DTD-R-2001-8, Department of Transportation Research, Aug. 2001 , Denver, Colorado (15 Pages).
Bahador Saket et ai, *Designing an Effective Vibration-Based Notification Interface for Mobile Phones*, School of Computing, National University of Singapore, Singapore, (11 Pages).
Christophe Tandonnet et al, *Tactile Stimulations and Wheel Rotation Responses; Toward Augmented Lane Departure Warning Systems*, Frontiers in Psychology, Oct. 2014, (11 Pages).
*Doppler Effect*, Wikipedia, the Free Encyclopedia, (10 Pages).
Kal Kaur, *Vehicle Crash Sensors: Blind Spot Detection*, (3 Pages).
*Jaguar Unveils Bike Sense: New Cars Will Alert Drivers to Cyclists*, 5 Pages.
Unpublished pending U.S. Appl. No. 15/186,850, which is not being furnished herewith, pursuant to the Commissioner's Notice dated Sep. 21, 2004.
Search Report dated Oct. 19, 2017, for GB Patent Application No. 1706487.4 (4 pages).
Unpublished pending U.S. Appl. No. 14/991,496, filed Jan. 8, 2016 which is not being furnished herewith, pursuant to the Commissioner's Notice dated Sep. 21, 2004.
Unpublished pending U.S. Appl. No. 14/972,761, which is not being furnished herewith, pursuant to the Commissioner's Notice dated Sep. 21, 2004.
Mike Duff, Jaguar Land Rover Demos "Instinctive" Bicycle and Motorcycle Warning System, Jan. 20, 2015, http://blog.caranddriver.com/jaguarlandroverdemosinstinctivebicycleandmotorcyclewarningsystemwvideo/.
Search Report dated Feb. 1, 2018, for GB Patent Application No. 1712959.4 (4 pages).
Search Report dated Aug. 9, 2018 for GB Patent Application No. GB 1802361.4 (5 pages).

* cited by examiner

SYSTEMS AND METHODS FOR DOOR COLLISION AVOIDANCE

TECHNICAL FIELD

The present application relates to controlling vehicle doors to avoid collisions.

BACKGROUND

In crowded environments such as cities, collisions may occur between external objects (e.g., other vehicles, bicycles, runners) and a host vehicle. Risk of collision is enhanced when a door of the host vehicle is being opened. Systems and methods are needed to reduce the risk of collision while a door is being opened.

SUMMARY

A vehicle includes: (a) a rotatable door including: a door stop assembly configured to arrest opening of the door; a rotatable handle; a haptic feedback assembly arranged to vibrate the handle; (b) processor(s) configured to simultaneously activate the door stop and haptic feedback assemblies. The haptic feedback assembly is disposed within the rotatable handle. The processor(s) are configured to: compute a time-to-collision, and run the haptic feedback assembly at a level based on the time-to-collision.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
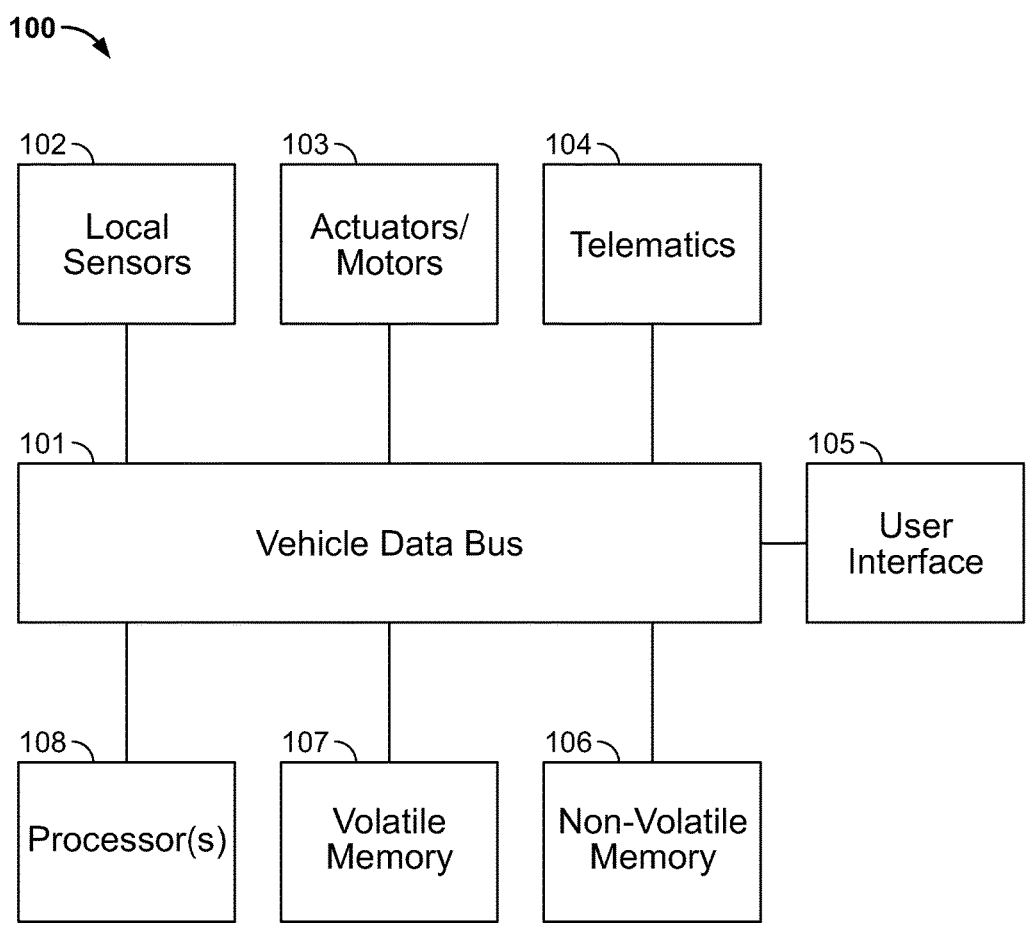
FIG. 1 is a block diagram of a vehicle computing system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

FIG. 1 shows a computing system 100 of host vehicle 200. Host vehicle 200 is connected, meaning that host vehicle 200 is configured to (a) receive wireless data from external entities (e.g., infrastructure, servers, other connected vehicles) and (b) transmit wireless data to external entities. Host vehicle 200 may be autonomous, semi-autonomous, or manual. Host vehicle 200 includes a motor, a battery, at least one wheel driven by the motor, and a steering system configured to turn the at least one wheel about an axis. Host vehicle 200 may be fossil fuel powered (e.g., diesel, gasoline, natural gas), hybrid-electric, fully electric, fuel cell powered, etc.

Vehicles are described, for example, in U.S. patent application Ser. No. 15/076,210 to Miller, U.S. Pat. No. 8,180,547 to Prasad, U.S. patent application Ser. No. 15/186,850 to Lavoie, U.S. Patent Publication No. 2016/0117921 to D'Amato, and U.S. patent application Ser. No. 14/972,761 to Hu, all of which are hereby incorporated by reference in their entireties. Host vehicle 200 may include any of the features described in Miller, Prasad, Lavoie, D'Amato, and Hu.

Computing system 100 resides in host vehicle 200. Computing system 100, among other things, enables automatic control of mechanical systems within host vehicle 200 and facilitates communication between host vehicle 200 and external entities (e.g., connected infrastructure, the Internet, other connected vehicles). Computing system 100 includes a data bus 101, one or more processors 108, volatile memory 107, non-volatile memory 106, user interfaces 105, a telematics unit 104, actuators and motors 103, and local sensors 102.

Data bus 101 traffics electronic signals or data between the electronic components. Processor 108 performs operations on electronic signals or data to produce modified electronic signals or data. Volatile memory 107 stores data for near-immediate recall by processor 108. Non-volatile memory 106 stores data for recall to the volatile memory 107 and/or the processor 108. Non-volatile memory 106 includes a range of non-volatile memories including hard drives, SSDs, DVDs, Blu-Rays, etc. User interface 105 includes displays, touch-screen displays, keyboards, buttons, and other devices that enable user interaction with the computing system. Telematics unit 104 enables both wired and wireless communication with external entities via Bluetooth, cellular data (e.g., 3G, LTE), USB, etc.

Actuators/motors 103 produce tangible results. Examples of actuators/motors 103 include fuel injectors, windshield wipers, brake light circuits, transmissions, airbags, motors mounted to sensors (e.g., a motor configured to swivel a local sensor 102), engines, power train motors, steering, blind spot warning lights, door motors etc.

Local sensors 102 transmit digital readings or measurements to processors 108. Examples of local sensors 102 include temperature sensors, rotation sensors, seatbelt sensors, speed sensors, cameras, lidar sensors, radar sensors, infrared sensors, ultrasonic sensors, clocks, moisture sensors, rain sensors, light sensors, etc. It should be appreciated that any of the various electronic components of FIG. 1 may include separate or dedicated processors and memory. Further detail of the structure and operations of computing system 100 is described, for example, in Miller, Prasad, Lavoie, and Hu.

Figure 2:
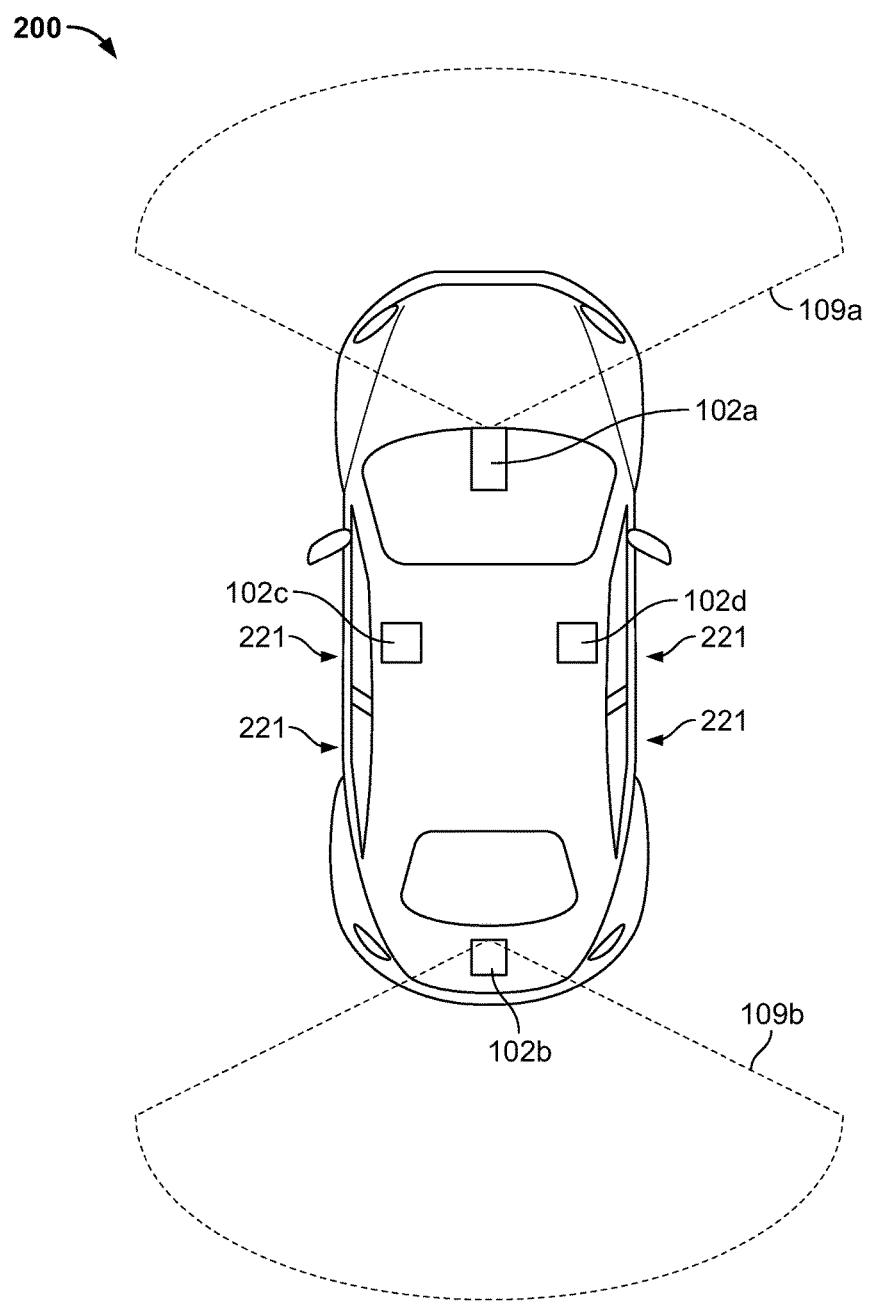
FIG. 2 is a top plan view of a host vehicle including the vehicle computing system.

FIG. 2 generally shows and illustrates host vehicle 200, which includes computing system 100. Some of the local sensors 102 are mounted on an exterior of host vehicle 200 (others are located inside host vehicle 200). Local sensor 102a is configured to detect objects leading host vehicle 200. Local sensor 102b is configured to detect objects trailing host vehicle 200 as indicated by trailing sensing range 109b. Left sensor 102c and right sensor 102d are configured to perform similar functions for the left and right sides of host vehicle 200.

As previously discussed, local sensors 102a to 102d may be ultrasonic sensors, lidar sensors, radar sensors, infrared sensors, cameras, microphones, and any combination thereof, etc. Host vehicle 200 includes a plurality of other local sensors 102 located in the vehicle interior or on the vehicle exterior. Local sensors 102 may include any or all of the sensors disclosed in Miller, Prasad, Lavoie, D'Amato, and Hu.

Host vehicle 200, and more specifically, processors 108 of host vehicle 200, is/are configured to perform the methods and operations described herein. In some cases, host vehicle 200 is configured to perform these functions via computer programs stored on volatile 107 and/or non-volatile 106 memories of computing system 100.

One or more processors are "configured to" perform a disclosed method step, block, or operation, at least when at least one of the one or more processors is in operative communication with memory storing a software program with code or instructions embodying the disclosed method step or block. Further description of how processors, memory, and software cooperate appears in Prasad. According to some embodiments, a mobile phone or external server(s) in operative communication with host vehicle 200 perform some or all of the methods and operations discussed below.

According to various embodiments, host vehicle 200 includes some or all of the features of vehicle 100a of Prasad. According to various embodiments, computing system 100 includes some or all of the features of VCCS 102 of FIG. 2 of Prasad. According to various embodiments, host vehicle 200 is in communication with some or all of the devices shown in FIG. 1 of Prasad, including nomadic or mobile device 110, communication tower 116, telecom network 118, Internet 120, and data processing center (i.e., one or more servers) 122. Each of the entities described in this application (e.g., the connected infrastructure, the other vehicles, mobile phones, servers) may share any or all of the features described with reference to FIGS. 1 and 2.

The term "loaded vehicle," when used in the claims, is hereby defined to mean: "a vehicle including: a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels." Host vehicle 200 may be a loaded vehicle.

The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels." Host vehicle 200 may be an equipped electric vehicle.

Figure 3:
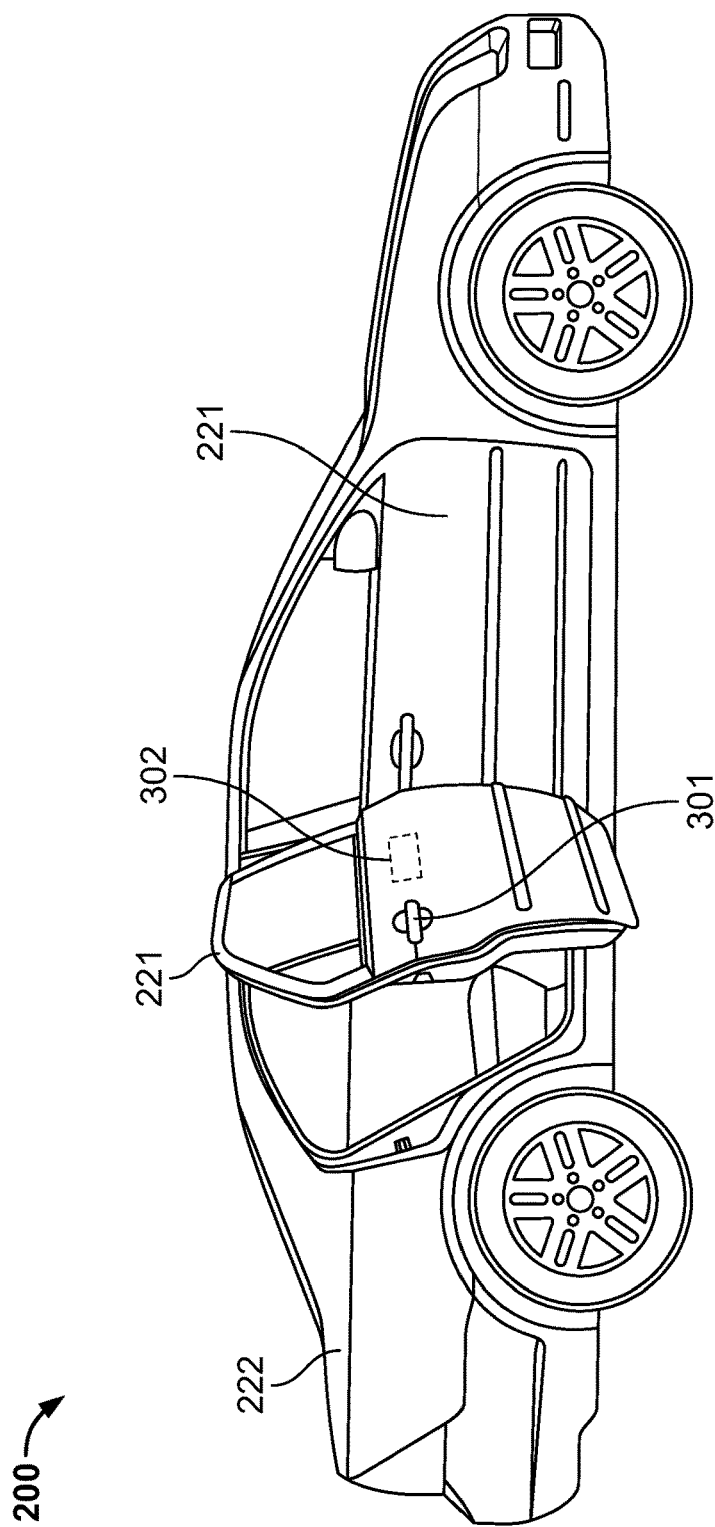
FIG. 3 is a side plan view of the host vehicle

Host vehicle 200 may include some or all of the features of the automotive vehicle described in U.S. Pat. No. 7,500,711 to Ewing, which is hereby incorporated by reference in its entirety. With reference to FIG. 3, host vehicle 200 includes rotatable doors 221. Each door 221 includes an outer handle 301 and an inner handle 302. Each handle 301, 302 is rotatable. Rotation of each handle 301, 302 is configured to cause a latch assembly (not shown) of door 221 to release from a counter latch assembly (not shown) of vehicle body 222, thus enabling opening of door 221. When door 221 is shut, the latch assembly engages the counter latch assembly to keep door 221 closed.

Figure 4:
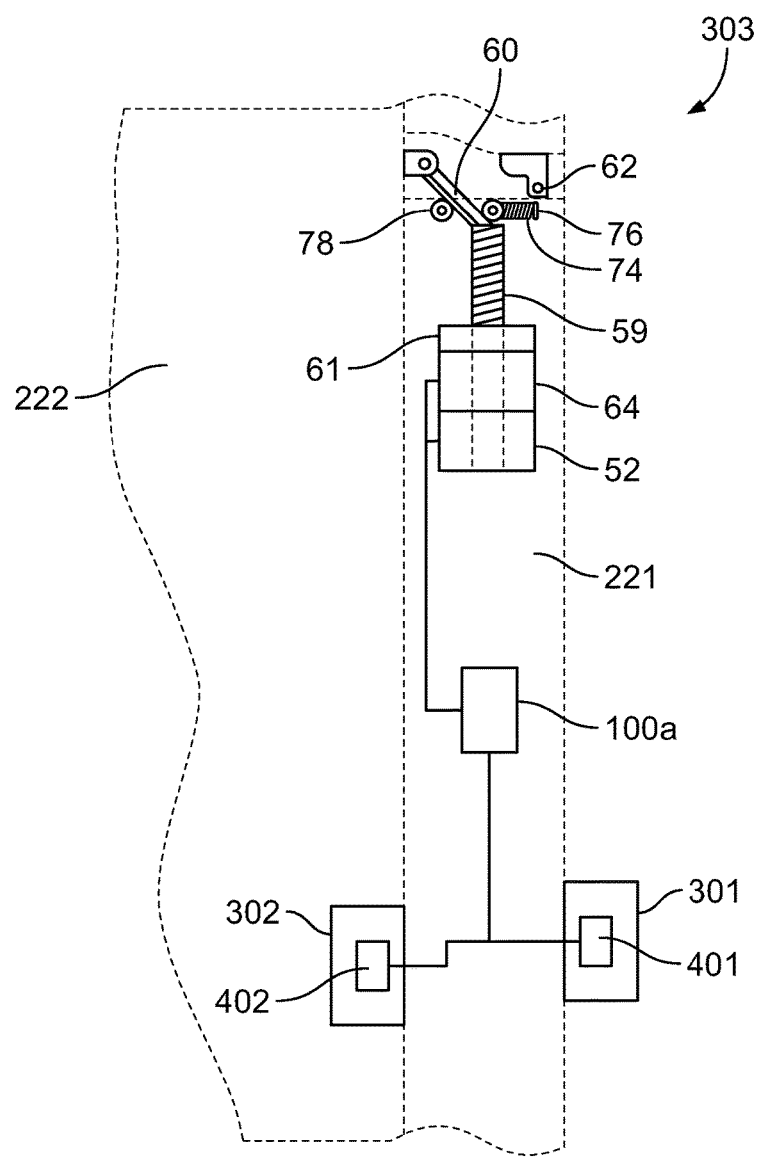
FIG. 4 is a schematic view of a door stop assembly.

Referring to FIG. 4, door 221 includes a stop assembly 303. Stop assembly 303 includes a controller 100a, a motor 52, an electric clutch 64, a gearbox 61, a lead screw 59, a first roller 74, a second roller 78, a spring 76, a hinge 62, and a check strap 60. Operation of one stop assembly 303 is described in Ewing at, for example, column 6, lines 9 to 46. In general, controller 100a controls rotation of motor 52 and engagement of clutch 64. When clutch 64 is engaged and motor 52 is active, lead screw 59 is longitudinally extended or retracted to open or close door 221 (depending on whether motor 52 rotates in a first direction or second opposite direction). Controller 100a is a unit or module of computing system 100.

Although Ewing applies stop assembly 303 to automatically open and close door 221, stop assembly 303 may be applied to resist or oppose user opening and closing of a door 221. For example, if a user were opening door 221 outward, motor 52 could be energized and clutch 64 could be engaged such that motor applies an inward or closing torque to door 221. The inward torque opposes the user's outward or opening torque, thus causing the door to stop, or at least slow.

Other stop assemblies 303 may be applied to arrest rotation of door 221. For example, U.S. patent application Ser. No. 15/237,514 to Melchor, which is hereby incorporated by reference in its entirety, discloses an energizable inhibitor. If the Melchor inhibitor were applied to door 221, the Melchor inhibitor would include first and second rollers 74, 78, and spring 76. More specifically, first roller 74 would correspond to one of Melchor upper and lower rollers. Second roller 74 would correspond to the other of Melchor upper and lower rollers. The Melchor inhibitor would act upon checkstrap 76, which would correspond to Melchor arm and thus include the various Melchor valleys. As discussed in Melchor, upon activation of the Melchor inhibitor, rollers 74, 78 would be stopped by upper and lower actuator assemblies of Melchor.

Outer door handle 301 includes a first haptic assembly 401. Inner door handle 302 includes a second haptic assembly 402. Each haptic assembly 401, 402 includes a haptic motor and a mass. Each haptic assembly 401, 402 is fully or at least partially housed within handle 301, 302 to discourage liquid from reaching haptic assemblies 401, 402.

The haptic motor is in wired or wireless communication with computing system 100 (e.g., controller 100a). A haptic motor is configured to drive or oscillate a mass. Oscillation of the mass induces vibrations. The oscillation can involve sliding a mass back and forth along a longitudinal slot. The oscillation can involve rotation or spinning of an asymmetrical mass. Example haptic motors or engines are described in Introduction to Haptic Feedback by Precision Microdrives™ and Haptic Blind Spot Alert System by Christopher Nebolsky, which are hereby incorporated by reference in their entirety.

Figure 5:
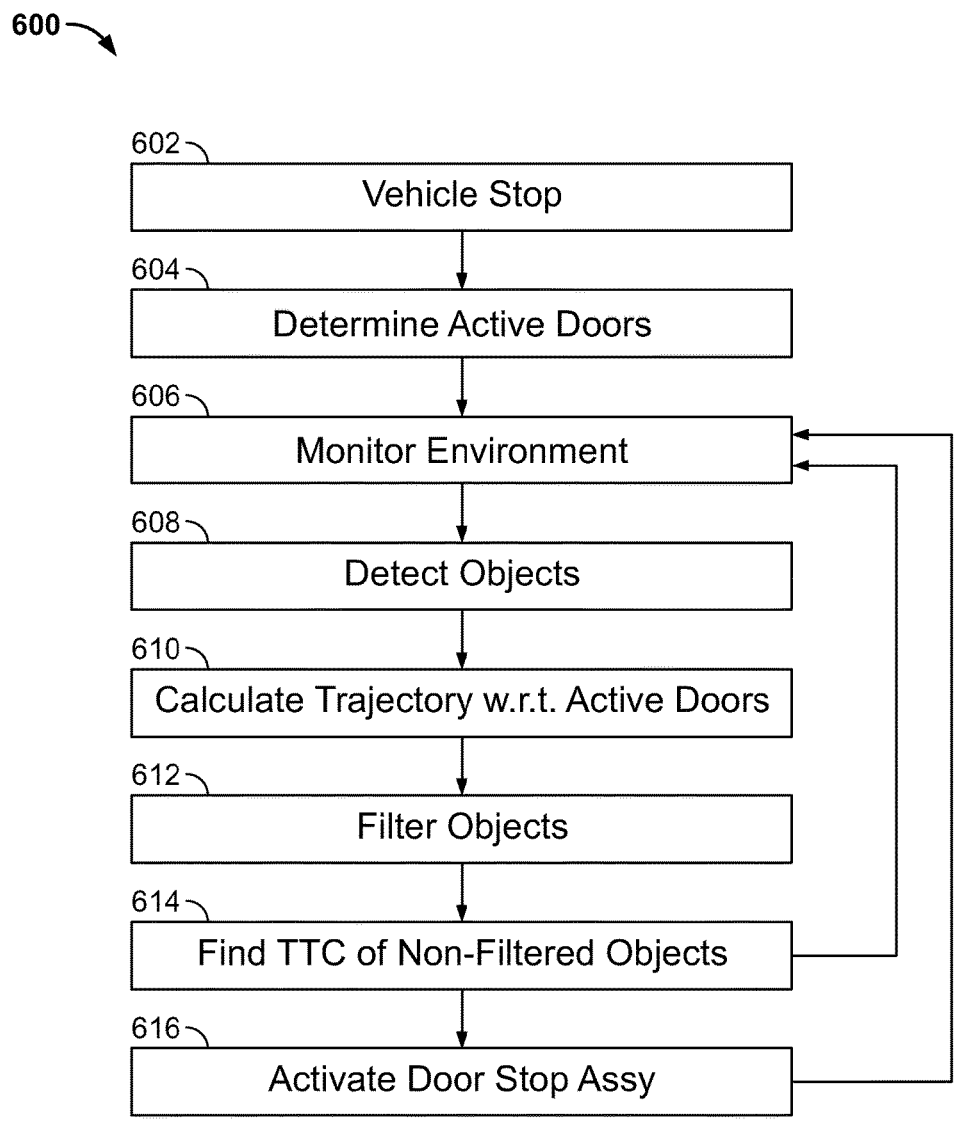
FIG. 5 is a block diagram of a method of activating a door stop assembly.

FIG. 5 generally shows and illustrates a operations 600 for controlling door stop assembly 303. Various similar operations are disclosed in Melchor. Operations 600 involve (a) predicting a door opening event, (b) predicting an expected collision with the door, and (c) activating the door stop assembly 303 to arrest motion of door 221 based on (a) and (b).

At block 602, host vehicle 200 detects a stopping event. Host vehicle 200 may detect such an event by (a) determining that host vehicle 200 has been placed in park and/or (b) determining that host vehicle 200 has reached a velocity of zero. At block 604, host vehicle 200 predicts opening of one or more of the doors 221. Doors predicted to have plausible probability of opening are called active doors.

Host vehicle 200 predicts opening of the driver door 221 based on one or more of the following events: (a) the vehicle being placed in park, (b) the driver seatbelt transitioning from engaged to disengaged within a predetermined time period prior to the vehicle being placed in park, (c) a weight sensor in the driver seat reading a reduced amount of weight compared with a steady state weight determined when host vehicle 200 was in motion.

Host vehicle 200 predicts opening of one of the front passenger 221 based on one or more of the following events: (a) the vehicle reaching a velocity of zero, (b) the front passenger seatbelt transitioning from engaged to disengaged within a predetermined time period prior to the vehicle reaching a velocity of zero, (c) a weight sensor in the front passenger seat reading a reduced amount of weight compared with a steady state weight determined when host vehicle 200 was in motion.

Host vehicle 200 predicts opening of the rear left passenger door 221 based on one or more of the following events: (a) host vehicle 200 reaching a velocity of zero, (b) any of the rear seat seatbelts transitioning from engaged to disengaged within a predetermined time period prior to the vehicle reaching a velocity of zero, (c) a weight sensor in the any of the rear seats reading a reduced amount of weight compared with a steady state weight determined when host vehicle 200 was in motion.

Host vehicle 200 predicts opening of the rear right passenger door 221 based on one or more of the following events: (a) the vehicle reaching a velocity of zero, (b) any of the rear seat seatbelts transitioning from engaged to disengaged within a predetermined time period prior to the vehicle reaching a velocity of zero, (c) a weight sensor in the any of the rear seats reading a reduced amount of weight compared with a steady state weight determined when host vehicle 200 was in motion.

Alternatively or in addition, host vehicle 200 may predict opening of any of the above-discussed doors based on (a) images captured by interior cameras and (b) capacitive door handle sensors. The images captured by the interior cameras may be run through suitable image processing software to determine when a user is touching a door. The capacitive door handle sensors may be capacitive sensors that detect when a user's hand touches (and thus changes the capacitance of) a door handle. The capacitive door handle sensors may be mounted in every inner and outer door handle.

At block 606, host vehicle 200 scans or monitors the environment via the local vehicle sensors 102a to 102d. At block 608, host vehicle 200 applies readings from the local vehicle sensors 102a to 102d to detect objects surrounding the vehicle. At block 610, host vehicle 200 calculates dimensions, trajectories, positions, velocities, and/or accelerations of the detected objects. At block 612, host vehicle 200 filters the objects based on one or more of the calculated dimensions, trajectories with respect to swept ranges of the active doors (i.e., the doors that have a plausible probability of opening), positions, velocities, and/or accelerations.

More specifically, host vehicle 200 may: ignore objects with dimensions falling below a predetermined dimensional threshold (e.g, having a low surface area); ignore objects having a trajectory not intersecting the swept ranges of the active doors; ignore objects that are at least a predetermined distance away from each of the swept ranges of the active doors; ignore objects having velocities falling below a predetermined velocity threshold; ignore objects having accelerations falling below a predetermined acceleration threshold, the predetermined acceleration threshold being a function of (a) current distance of the object from the swept range of the active door that intersects the trajectory of the object, and (b) current velocity of the object.

It should be appreciated that swept ranges of the doors are the arc-shaped full range of possible door positions. For example, the swept range of the driver door 221 includes (a) the position of the door 221 when fully closed, (b) the position of the door 221 when fully open, and (c) all intermediate positions of the door. It should thus be appreciated that the swept range of the driver door 221 is arc-shaped with one end of the arc corresponding to the door being fully closed and the opposing end of the arc corresponding to the door being fully open. It should further be appreciated that host vehicle 200 may calculate intersections between objects and doors assuming that non-door components are complete barriers (e.g., if a bicycle is on the right side of host vehicle 200 and the trajectory of a bicycle intersects door 221 on the left side of host vehicle 200, then host vehicle 200 will disregard the intersect between door 400 and the bicycle).

At block 614, host vehicle 200 calculates a time-to-collision (TTC) between the non-filtered objects and the swept ranges of the active doors that intersect the trajectories of the non-filtered objects (i.e., the relevant doors 221). For example, if the trajectory of a bicycle intersects driver door 221 and driver door 221 is active, then host vehicle 200 finds TTC between swept range of driver door 221 and the bicycle. If the trajectory of the bicycle intersects two doors 221 and both doors 221 are active, then host vehicle 200 finds TTC between each swept range of each door 221 and the bicycle.

TTC is based on (a) velocity of the object, (b) position of the object with respect to the swept range of the door, (c) acceleration of the object, and/or (d) heading of the object with respect to the swept range of the door. Calculation of TTC is described in U.S. patent application Ser. No. 15/183,355 to Bidner, which is hereby incorporated by reference in its entirety. If multiple non-filtered objects intersect the active same door, then the minimum TTC is applied. The operations discussed below may be applied, in parallel, for each active door 221.

If the TTC is above a predetermined threshold value, then host vehicle 200 returns to block 606, causing the operations 600 to cycle or repeat. Host vehicle 200 may cycle the operations 600 for a predetermined amount of cycling time. Host vehicle 200 may cycle the operations 600 until (a) at least one door has been 100% opened, (b) none of the seat weight sensors have measured a weight consistent with a human passenger for at least a predetermined amount of time, (c) values returned by the seat weight sensors have remained constant (within a predetermined degree e.g., ±5%) for at least a predetermined amount of time, and/or (d) the interior cameras no longer detect the presence of any users in host vehicle 200.

If the TTC falls below a predetermined threshold time value, then host vehicle 200 proceeds to block 616 and takes one or more actions. The actions may include (a) activating door stop assembly 303; (b) flashing a light, siren, or playing an audio message to deter the external object; (c) displaying or sounding an internal warning in the vehicle. Thereafter, host vehicle 200 returns to block 606 and repeats the cycle. As previously discussed, (a) activating door stop assembly 303 may include one or more of: (i) activating the linear actuator assemblies of the inhibitors corresponding to the active doors associated with the TTCs below the predetermined threshold time value, (ii) engaging clutches 64 and running motors 62 in a direction to oppose opening of the active doors with the TTCs below the predetermined threshold time value, and/or (iii) activating one or both haptic assemblies 401, 402 to vibrate handles 301, 302.

Figure 6:
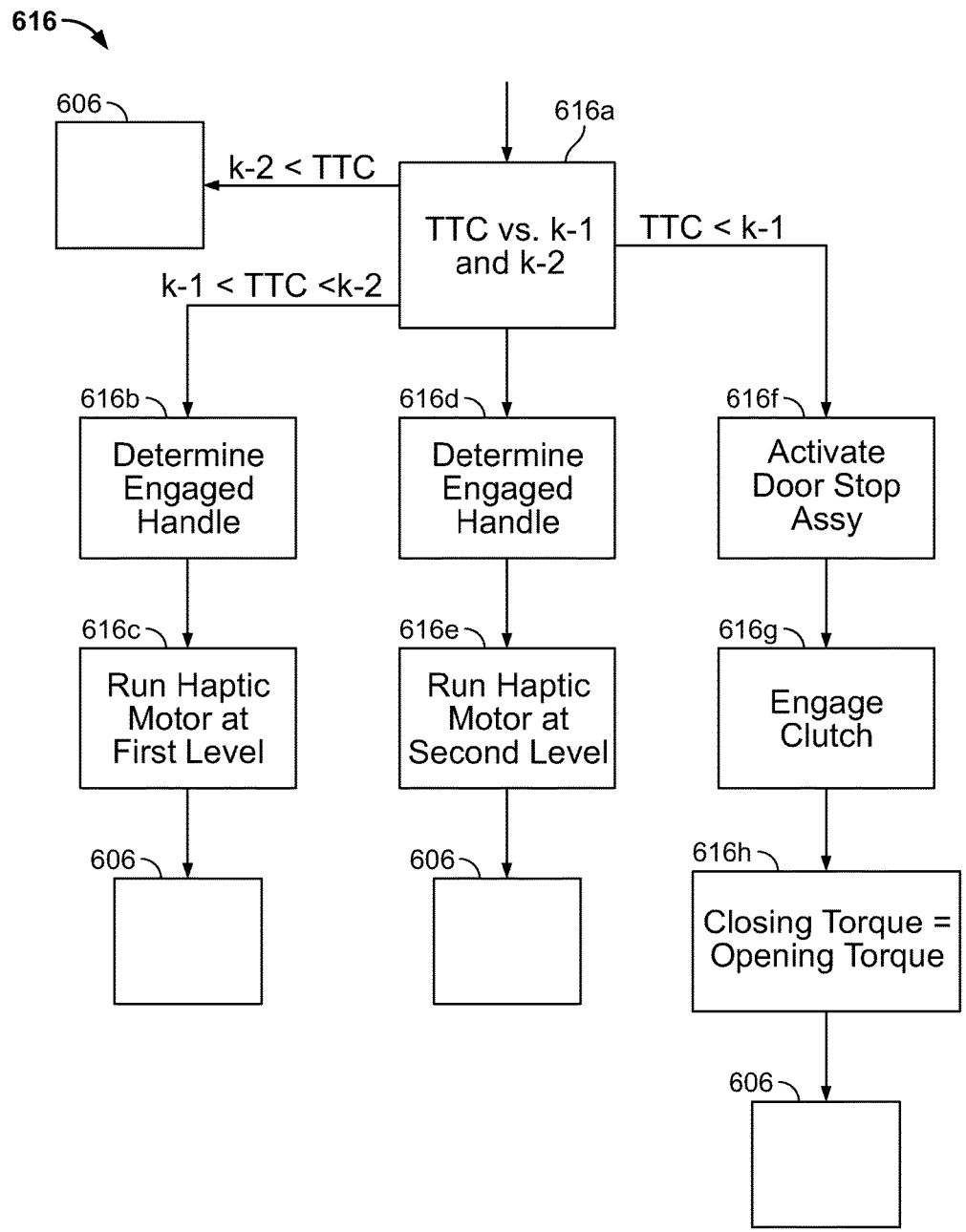
FIG. 6 is a block diagram showing further details of a method of activating a door stop assembly.

FIG. 6 shows additional features of block 616. Block 616 may be simultaneously executed for each intersected door 221. As stated above, a minimum TTC between the relevant door 221 and a non-filtered object is found at block 614. At 616a, the minimum TTC is compared with predetermined constants k-1 and k-2, where k-2 is larger than k-1 (e.g., k-2 is 3 seconds and k-1 is 2 seconds). If TTC>k-2, then host vehicle 200 returns to block 606. If k-1<TTC<k-2, then host vehicle proceeds to 616b. If TTC<k-1, then host vehicle 200 proceeds to both of blocks 616d and 616f.

At block 616b, host vehicle 200 determines which handle (i.e., outer handle 301 or inner handle 302) has been rotated/actuated by the user. As with all blocks and operations disclosed herein, host vehicle 200 may skip block 616b and simply select all handles 301, 302 of the relevant door 221. At block 616c, host vehicle 200 instructs the haptic motor associated with the selected handle to run at a first level (e.g., a first rotational speed). As such, the selected handle vibrates, warning the user to refrain from opening the door. After block 616b, host vehicle 200 returns to block 606.

Blocks 616d and 616f are executed simultaneously (i.e., in parallel). Blocks 616d and 616e are the same as previously discussed blocks 616b and 616c, except the haptic motor(s) are run at a second level (e.g., a second rotational speed). The second level exceeds the first level such that greater vibrations are generated.

At block 616f, host vehicle 200 activates the door stop assembly 303 of the relevant door 221. If the door stop assembly 303 is a Melchor inhibitor, then the inhibitor is activated, as discussed above and in Melchor. If the door stop assembly 303 is the Ewing motor and clutch, then clutch 64 is engaged at block 616g. At block 616h, motor 52 is run at a torque level equal to the door opening torque applied by the user. Block 616h is iterative and the torque level is continuously adjusted such that closing torque is equal to opening torque while block 616h is active. As such, if the door opening torque drops to zero, then the door closing torque also drops to zero (i.e., motor 52 is stopped). The torque level of block 616h may be a user user-adjustable percentage ranging from 0 to 100% of the door opening torque generated by the user. If, for example, the percentage is set at 50%, then motor 52 is run at a torque level equal to half of the door opening torque applied by the user. The torque level of block 616h may vary based on the opening degree of the door. For example, when the door is cracked, the torque level may be small and when the door is 50% open, the torque level may be large.

According to some embodiments, host vehicle 200 may determine a range of safe positions and a range of unsafe positions based on a predicted path of a detected object. For example, host vehicle 200 may determine that a detected object will only intersect a door when the door is more than 30% open. In this case, host vehicle 200 may gradually increase the torque level as the door opens such that at 30% opening, the torque level reaches 100% (thus preventing the user from opening the door past a 30% opening). The haptic motor may be run at a level based on the level of closing torque applied by the Ewing motor (e.g., at low second level when the closing torque is 0 to 33% of the user applied opening torque, a medium second level when the closing torque is 34 to 67% of the user applied opening torque, and a high second level when the closing torque is 68 to 100% of the user applied opening torque.

Since the operations 600 of FIG. 5 may cycle, host vehicle 200 may continue to apply the above actions until returning to the next iteration of block 616 and overriding the actions with a new command. If the next iteration of block 616 does not include the same actions, then host vehicle 200 terminates the currently active actions that are missing from the new iteration of block 616.

According to some embodiments, host vehicle 200 may automatically deactivate the stop assembly 303, thus enabling the user to open a stopped door 221, upon (a) a user command via the user interface 105, (b) detecting repeated attempts (e.g., at least two attempts or at least discrete three attempts) to open the stopped door 221. Host vehicle 200 may determine condition (b) by recording, through suitable sensors 102, an amount of torque applied by motor 52 to retain door 221 in the stopped position. If the opening torque exceeds a predetermined torque at least a predetermined number of instances (e.g., one time or three instance) and/or for a predetermined amount of time, then host vehicle 200 may automatically deactivate motor 52. An "instance" may occur when the opening torque begins below the predetermined torque, then rises above the predetermined torque. In this case, two "instances" would require the opening torque to begin below the predetermined torque, rise above the predetermined torque, fall below the predetermined torque, then rise above the predetermined torque.

According to some embodiments, the vehicle may determine condition (b) by sensing or recording an angular position of the door handle. If the vehicle detects that the door handle has rotated from its resting position (i.e., flush or parallel with the vehicle door) the predetermined number of times, then the vehicle may automatically deactivate the door stop assembly 303.

The invention claimed is:

1. A vehicle comprising:
   a sensor;
   a door including:
      a door stop assembly;
      a handle; and
      a haptic device; and
   a processor to:
      detect, via the sensor, a bicycle predicted to intersect a sweep range of the door;
      determine a time-to-collision (TTC) of the bicycle; and
      simultaneously stop the door from opening, via the door stop assembly, and vibrate the handle, via the haptic device, when the TTC is less than a first threshold.

2. The vehicle of claim 1, wherein the haptic device is disposed within the handle.

3. The vehicle of claim 1, wherein the processor is configured to
   cause the haptic device to vibrate the handle at a high level when the TTC is less than the first threshold.

4. The vehicle of claim 3, wherein, when the TTC is greater than the first threshold and less than a second threshold, the processor is configured to:
not activate the door stop assembly; and
cause the haptic device to vibrate the handle at a low level.

5. The vehicle of claim 4, wherein, when the TTC is greater than the second threshold, the processor is configured to:
not activate the door stop assembly; and
not cause the haptic device to vibrate the handle.

6. The vehicle of claim 1, wherein, to stop the door from opening via the door stop assembly, the processor is configured to:
engage a clutch of the door stop assembly;
determine a door opening torque upon engaging the clutch; and
run a motor of the door stop assembly at a level that is equal and opposite to the door opening torque.

7. A method of comprising:
detecting, via a sensor, a bicycle predicted to intersect a sweep range of a door of a vehicle;
determining, via a processor, a time-to-collision (TTC) between the bicycle and the door; and
responsive to determining that the TTC is less than a first threshold, simultaneously activating a door stop assembly to stop the door from opening and causing a haptic device to vibrate a handle of the door.

8. The method of claim 7, further including comprising:
causing the haptic feedback device to vibrate the handle at a high level when the TTC is less than the first threshold.

9. The method of claim 8, further including:
causing the haptic device to run at a low level when the TTC is greater than the first threshold and less than a second threshold;
causing the haptic device not to run when the TTC is greater than the second threshold; and
not activating the door stop assembly when the TTC is greater than the first threshold.

10. The method of claim 7, wherein activating the door stop assembly includes:
engaging a clutch of the door stop assembly;
upon engaging the clutch, determining a door opening torque; and
running a motor of the door stop assembly at a level that is equal and opposite to the door opening torque.

11. The vehicle of claim 1, wherein, to detect whether the bicycle is to intersect the sweep range of the door, the processor is configured to identify a direction of travel of the bicycle.

12. The vehicle of claim 1, wherein the processor is to determine the TTC of the bicycle in response to predicting an opening event of the vehicle.

13. The vehicle of claim 12, wherein the processor is configured to predict the opening event based upon at least one of the vehicle being in park, a seatbelt becoming disengaged, a weight sensor of a seat detecting a reduced amount of weight, a capacitive sensor of the handle, and an image captured by an interior camera.

14. The vehicle of claim 1, wherein the processor is to determine the TTC based upon at least one of a position, a velocity, an acceleration, and a direction of travel of the bicycle.

15. The vehicle of claim 1, wherein, to stop the door from opening, the processor is configured to activate linear actuators of inhibitors of the door stop assembly.

16. The method of claim 7, further including detecting whether the bicycle is to intersect the sweep range of the door by identifying a direction of travel of the bicycle.

17. The method of claim 7, wherein the TTC between the bicycle and the door is determined in response to predicting an opening event of the vehicle.

18. The method of claim 17, wherein the opening event is predicted based upon at least one of the vehicle being in park, a seatbelt becoming disengaged, a weight sensor of a seat detecting a reduced amount of weight, a capacitive sensor of the handle, and an image captured by an interior camera.

19. The method of claim 9, wherein the TTC is determined based upon at least one of a position, a velocity, an acceleration, and a direction of travel of the bicycle.

20. The method of claim 7, wherein activating the door stop assembly includes activating linear actuators of inhibitors.

* * * * *